United States Patent
Ungar et al.

(10) Patent No.: US 6,199,075 B1
(45) Date of Patent: Mar. 6, 2001

(54) METHOD AND APPARATUS FOR GENERATIONAL GARBAGE COLLECTION OF A HEAP MEMORY SHARED BY MULTIPLE PROCESSORS

(75) Inventors: David M. Ungar; Mario I. Wolczko, both of Palo Alto, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 08/866,351

(22) Filed: May 30, 1997

(51) Int. Cl.[7] ........................................................ G06F 17/30
(52) U.S. Cl. .............................. 707/206; 707/10; 707/104
(58) Field of Search ............................... 707/206, 10, 104

(56) References Cited

U.S. PATENT DOCUMENTS

| | | | |
|---|---|---|---|
| 4,121,286 | * 10/1978 | Venton et al. | 364/200 |
| 4,757,438 | 7/1988 | Thatte et al. | 364/200 |
| 4,775,932 | * 10/1988 | Oxley et al. | 364/200 |
| 4,797,810 | * 1/1989 | McEntee et al. | 364/200 |
| 4,907,151 | 3/1990 | Bartlett | 364/200 |
| 4,920,483 | 4/1990 | Pogue et al. | 364/200 |
| 5,088,036 | * 2/1992 | Ellis et al. | 707/206 |
| 5,222,221 | 6/1993 | Houri et al. | 395/375 |
| 5,293,614 | * 3/1994 | Fergunson et al. | 707/206 |
| 5,301,288 | 4/1994 | Newman et al. | 395/400 |
| 5,355,483 | 10/1994 | Serlet | 395/650 |
| 5,408,650 | 4/1995 | Arsenault | 395/575 |
| 5,421,673 | * 6/1995 | Esters et al. | 405/129 |
| 5,535,329 | 7/1996 | Hastings | 395/183.11 |
| 5,551,003 | * 8/1996 | Mattson et al. | 395/463 |
| 5,560,003 | 9/1996 | Nilsen et al. | 395/600 |
| 5,561,786 | 10/1996 | Morse | 395/497.01 |
| 5,566,321 | 10/1996 | Pase et al. | 395/480 |
| 5,652,883 | * 7/1997 | Adcock | 707/6 |
| 5,819,299 | * 10/1998 | Bejar | 707/206 |
| 5,842,016 | * 11/1998 | Toutonghi et al. | 395/676 |
| 5,845,298 | * 12/1998 | O'Connor et al. | 707/206 |
| 5,857,210 | * 1/1999 | Tremblay et al. | 707/206 |
| 5,873,104 | * 2/1999 | Tremblay et al. | 707/206 |

OTHER PUBLICATIONS

Jones et al, Garbage Collection Algorithms for Automatic Dynamic Memory Management, John Wiley & Sons Ltd, pp. 146–151, 1996.*

Aho, et al., "Compilers: Principles, Techniques and Tools," Addison–Wesley Publishing Company, pp. 585–607, (1985).

Anderson, James R., "Simulation and Analysis of Barrier Synchronization Mehods," University of Minnesota, Technical Report No. HPPC–95–04 (Aug. 1995).

Anderson, et al., "Lock–Free Transactions for Real–Time Systems," in *Real–Time Database Systems: Issue and Applications,* Kluwer Academic Publishers, Norwell Massachusetts (1997).

Appleby, Karen, "Garbage Collection for Prolog Based on WAM," Communications of the ACM, vol. 31, Issue 6, pp. 1–20, (Jun. 1, 1988).

(List continued on next page.)

*Primary Examiner*—Thomas G. Black
*Assistant Examiner*—Frantz Coby
(74) *Attorney, Agent, or Firm*—Park & Vaughan LLP

(57) ABSTRACT

Apparatus, methods, systems and computer program products are disclosed describing generational garbage collection on a card-marked heap memory shared by multiple processing units. When one of the processing units detects that the free space available for node creation is below a threshold, that processing unit pauses its heap mutation processes and signals the other processing units to also pause mutation. After the other processing units pause heap mutation, the processing units then proceed to execute generational garbage collection procedures on the shared heap. The generational garbage collection procedures for each processing unit are driven by pointers stored in each processing unit's register, stack and static variables along with pointers within a specified partition of the shared card-marked heap. The processing units resume mutation of the heap once they all complete their garbage collection processes.

16 Claims, 12 Drawing Sheets

OTHER PUBLICATIONS

Barrett, David A., "Improving Performance of Conservative Generational Garbage Collection," Technical Report CU–CS–784–95, University of Colordao at Boulder (Sep. 1995).

Booch, Grady, "Object Oriented Design with Applications," The Benjamin/Cummings Publishing Company, Inc., pp. 26–71, (1991).

Bott, Ed, "Windows'Invisible wall; The 64K Barrier," Windows Exam, pp. 210–212, (Mar. 1994).

Caro, Alejandro, "A Novel 64 Bit Data Representation for Garbage Collection and Synchronizing Memory," Computation Structures Group Memo 396, Massachusetts Institute of Technology, (Apr. 9, 1997).

Chandra, et al., "Scheduling and Page Migration for Multiprocessor Compute Servers," Proceedings of Architectural Support for Programming Languages and Operating Systems (1994).

Cohn, et al., "Java Developer's Reference," pp. 1009–1010, Sams.net Publishing, (1996).

Courts, Robert, "Improving Locality of Reference in a Garbage Collecting Memory Management System," Communications of the ACM, vol. 31, No. 9, pp. 1128–1139, (Sep. 1988).

Grehan, Rick, "If Memory Serves . . . ," BYTE, pp. 279–337, (Aug., 1989).

Grehan, Rick, "Virtually Virtual Memory," BYTE, pp. 455–464, (Sep. 1990).

Harbaugh, et al., "HeapGuard, Eliminating Garbage Collection in Real–Time Ada Systems," Integrated Software, Inc., pp. 704–708, (1995).

Hölzle, Urs, "A Fast Write Barrier for Generational Garbage Collectors," Presented at the OOPSLA '93 Garbage Collection Workshop, Washington, D.C., (Oct. 1993).

Imai, et al., "Evaluation of Parallel Copying Garbage Collection on a Shared–Memory Multiprocessor," IEEE Transaction on Parallel and Distributed Systems, vol. 4, No. 9 (Sep. 1993).

Jones, et al., "Garbage Collection: Algorithms for Automatic Dynamic Memory Management," John Wiley & Sons, Ltd., pp. 1–14, (1990).

Kuechlin, et al., "On Multi–Threaded List–Processing and Garbage Collection," Department of Computer and Information Science, Ohio State University, pp. 894–897, (1991).

Moon, et al., "Garbage Collection in a Large Lisp System," Association for Computing Machinery (1984).

Muller, et al., "Multitasking and Multiheading on a Multiprocessor with Virtual Shared Memory," Published in: Proceedings of the 2nd International Symposium on High–Performance Computer Architecture, Feb. 5–7, 1996, San Jose, California, pp. 212–221.

Pike, et al., "Process Sleep and Wakeup on a Shared–Memory Multiprocessor," Lucent Technologies (1995).

Plevyak, et al., "A Hybrid Execution Model for Fine–Grained Languages on Distributed Memory Multicomputers," The Association for Computing Machinery, Inc., (1995).

Shaw, Richard H., "An Introduction to the Win32 API," PC Magazine, vol. 13, No. 4, pp. 291–295, (Apr. 26, 1994).

van der Linden, Peter, "Not Just Java," pp. 156–165, Sun Microsystems, Inc., (1997).

Wallace, et al., "Simple Garbage Collection in G++," Cygnus Support, pp. 1–4, no date.

Wilson, et al., "Dynamic Storage Allocation: A Survey and Critical Review," Department of Computer Sciences, University of Texas at Austin, pp. 1–78.

Yang, et al., "Fast, Scalable Synchronization with Minimal Hardware Support," Presented at the Proceedings of the Seventh Annual ACM Symposium on Principles of Distributed Computing, ACM, New York, pp. 171–182, Aug. 1993.

Yang, et al., "A Fast,Scalable Mutual Exclusion Algorithm," Presented at the Twelfth Annual ACM Symposium on Principles of Distributed Computing, Ithica, New York, Aug. 1993.

GC–FAQ—draft, 29 pages, http://www.centerline.com/people/chase/GC/GC–faq.html, no date.

Chung, K–M. and Herbert, Y., "A 'Tiny' Pascal Compiler Part 1: The P–Code Interpreter," Byte Publications, Inc. 59–65, 148–155 (1978).

Chung, K–M. and Herbert, Y., "A 'Tiny' Pascal Compiler Part 2: The P–Compiler," Byte Publications, Inc. 34–52 (1978).

McDaniel, G., "An Analysis of a Mesa International Set," Xerox Corporation, Palo Alto Research Centers. 1–17 (1982).

Mitchell, J.G. et al., "Mesa Language Manual," Xerox Corporation, Palo Alto Research Centers. 1–150 (1982).

Pier, K.A., "A Retrospective on the Dorado, A High–Performance Personal Computer," Xerox Corporation Palo Alto Research Centers. 252–269 (1983).

Thompson, K., "Regular Expression Search Algorithm," Communications of the ACM. 11: (06) 419–422 (1968).

Ogata, K., Kurhiara, S., Inari, M., Doi, N., "The Design and Implementation of HoME," ACM SIGPLAN Noices, 27(1992) Jul., No. 7, pp. 44–54.

Imai, A., Tick E., Evaluation of Parallel Copying Garbage Collection on a Shared–Memory Multiprocessor, IEEE Transactions on Parallel and Distributed Systems, 4(1993) Sep., No. 9, pp. 1030–1040.

Lins, R. D., "A Multi–processor Shared Memory Architecture for Parallel Cyclic Reference Counting," Microprocessing and Microprogramming, vol. 35, No. 1 / 05, Sep. 1, 1992, pp. 563–569.

* cited by examiner

METHOD AND APPARATUS FOR GENERATIONAL GARBAGE COLLECTION OF A HEAP MEMORY SHARED BY MULTIPLE PROCESSORS

BACKGROUND OF THE INVENTION

1. Field of the Invention

This invention relates to the field of computer memory allocation and deallocation. Specifically, this invention is a new and useful method, apparatus, system, and computer program product for using generational garbage collection techniques to automatically reclaim garbage nodes from a heap memory shared by a plurality of processing units.

2. Background

Memory allocation and deallocation techniques have become very important in structured programming and object oriented programming methodologies. Memory allocated from a heap can be used to store information. Often this information is an instantiated object within an object-oriented paradigm. An allocated portion of heap memory is a node. The subsequently described techniques apply to both nodes that contain data and nodes that are instantiated objects. These nodes are explicitly allocated by a program. However, many modern systems use heap-memory garbage collection techniques to recover previously allocated nodes that are no longer used. Additionally, modern computers often have multiple processing units that can access a shared heap memory, with each processing unit allocating nodes in the shared heap (thus mutating the shared heap) and each processing unit being capable of performing garbage collection on the shared heap.

Introduction to Garbage Collection

Computer memory is a resource. Programs cause a computer to perform operations (to execute) based on instructions stored in memory. Executing programs also use memory to store information. This information is often organized into memory resident data structures. These data structures are often linked together by pointers from one structure to another and are often referenced through pointers in static, register and stack variable storage.

Executing programs often need memory for a purpose that extends for a limited period of time. For example, a program may allocate memory to hold information, store the information into the allocated memory, operate on the stored information to produce a result, and then have no further need of the stored information. Once the program no longer needs the stored information, the allocated memory can be released for later reuse.

Modern programming languages provide facilities for static, stack and heap allocation of memory. Static allocation binds variables to storage locations at compile and/or link time. Stack allocation pushes an activation frame on the processing unit's stack when a program block prepares to execute. This activation frame contains storage for variables within the scope of execution for the program block executing in the processing unit. Once the program block completes, the activation frame is popped from stack. Variables stored in the activation frame are not saved from one activation of the block to the next. Heap allocation allows memory for variables to be allocated and deallocated in any order and these variables can outlive the procedure (or block) that created them. Once memory is deallocated it is available for reallocation for another use.

A "node" is an area of memory allocated from a heap. Nodes are accessed through pointers. A direct (or simple) pointer is the node's address in the heap. An indirect pointer (sometimes called a "handle") points to an address in memory that contains the address of the node. More complex pointers exist. Indirect pointers allow nodes to be moved in the heap without needing to update the occurrences of the handle.

The "root set" is a set of node references such that the referenced nodes must be retained regardless of the state of the heap. A node is reachable if the node is in the root set, or referenced by a reachable node. The "reference set" is the set of node references contained in a node. A memory leak occurs when a node becomes unreachable from the root set and is never reclaimed. A memory leak reduces the amount of heap memory available to the program. A garbage node is a node that becomes unreachable from the root set and can be reclaimed.

Heap memory can be used by invoking explicit node allocation and deallocation procedures. However, although a programmer knows when a new node is required, it is often difficult for the programmer to know when a node is no longer reachable. Thus, problems may occur when programmers explicitly deallocate nodes. One of these problems is that it is very difficult to debug memory leaks. Often the design of the application being programmed obfuscates when the programmer can explicitly deallocate memory. Additionally, when one portion of a program is ready to deallocate memory, it must be certain that no other portion of the program will use that memory. Thus, in object oriented programming (OOP) languages, multiple modules must closely cooperate in the memory management process. This, contrary to OOP programming methodology, leads to tight binding between supposedly independent modules.

These difficulties are reduced if the programmer need not explicitly deallocate memory. Automatic garbage collection methods scan memory for referenced nodes and recover garbage nodes—but at a cost. The process of finding and deallocating garbage nodes takes processor resources. Balancing the impact of the garbage collection process on an executing program is important because the primary function of the program may require timely operation, uninterrupted user interaction or be subject to some other real-time constraint.

A mutator program changes (mutates) the connectivity of the graph of live nodes in the heap. One skilled in the art will recognize that in the context of this invention, the term "mutation" includes any activity that accesses the nodes in the heap for purposes other than garbage collection. In a system using garbage collection, nodes are allocated from the heap as memory is needed by the mutator program. These nodes are not initially reclaimed when they are no longer needed. Instead, when a memory allocation attempt fails or in response to some condition (for example, on expiration of a clock or counter), the garbage collection process is automatically invoked and unused memory allocated to garbage nodes is reclaimed for subsequent reuse.

Some garbage collection methods copy (or scavenge) nodes (that is, these methods relocate nodes that appear to be alive from one location in the heap to another location). These methods require a mechanism that allows existing pointers to the original location of the node to be used to access the relocated node. These mechanisms include (among others) updating existing pointers to the node's original location and providing indirect pointers to the new location of the node.

Generational Garbage Collection

Generational garbage collection techniques use the observation that many nodes allocated from the heap are only used for a short period of time. These nodes are allocated for a specific short-term purpose, used for the purpose, and then can be deallocated for possible later reuse. Thus, garbage collection algorithms that concentrate on younger nodes are more efficient than those that process all nodes identically because fewer nodes need to be examined during the garbage collection process.

Generational garbage collection algorithms separate nodes into two or more areas in the heap depending on the node's age. Each area is a generation. Nodes are first allocated from the creation area within the youngest generation and are copied to the older generation if the node survives long enough ("long enough" is often until a subsequent scavenge operation). These garbage collection algorithms concentrate on reclaiming storage from the youngest generation area where most of the garbage is found. Generally, the number of live nodes in the youngest generation is significantly less than the number of live nodes in the other generation areas so that the time required to scavenge nodes in the youngest generation is less than the time required to scavenge the other generation areas. A scavenge operation of the newer generation is termed a minor collection. Any garbage collection operation on an older generation area is termed a major collection. The minor collection operation occurs more frequently than the major collection operation because of the reduced overhead and higher efficiency of the minor collection process.

Once a node is copied, any pointers to the copied node must be updated or tracked so that future references to the copied node eventually succeed. Further, pointers to nodes in the younger generation contained in copied nodes must be accessed to determine the reference set.

FIG. 1a illustrates a shared heap area indicated by general reference character 100. The shared heap area 100 includes a generational garbage collection area 101. The generational garbage collection area 101 includes a younger generation 103 and an older generation area 105. In this example, the younger generation 103 is subdivided into a creation area 107, a 'to' area 109, and a 'from' area 111. Nodes (such as a new node 113) are first created in the creation area 107. When the creation area 107 fills, live nodes in the creation area 107—such as the new node 113—along with live nodes in the 'from' area 111, are copied to the 'to' area 109 (thus emptying the creation area 107) and the meaning of the 'to' area 109 and the 'from' area 111 are interchanged. Those skilled in the art will understand that live nodes in the younger generation 103 are copied to the older generation area 105 as determined by the implementation of the garbage collection process. This results in a promoted node 115 in the older generation area 105. One skilled in the art will understand that other generational implementations exist. Further, one skilled in the art will understand that the creation area 107 contains the youngest nodes.

Card Marking

The process to determine the root set often takes significant processor time searching for pointers in the heap. One optimization used in the prior art is to segment the heap into equal size areas (called cards) and to mark each card when a write operation occurs within the card—a form of a write-barrier. Thus, only cards marked as 'dirty' (instead of all the cards in the heap memory) are searched for pointers when updating the root set. FIG. 1b illustrates the use of card marking. A card-marked heap, indicated by general reference character, 120 includes a card-marked region of heap memory 121. The card-marked region of heap memory 121 contains a first card 123 and a last card 125. A plurality of nodes 127 are distributed throughout the card-marked region of heap memory 121. The first card 123 is associated with a first card marker 129 and the last card 125 is associated with a second card marker 131. Both the first card marker 129 and the second card marker 131 are contained in a card mark vector 133. When memory is modified in one of the cards 123, 125, the appropriate card marker is flagged. Thus, in the illustration of FIG. 1b, a write operation was performed within the first card 123 subsequent to the last scavenge of the card-marked region of heap memory 121. This write operation marked the first card marker 129 as 'dirty' as indicated by the 'X' in the first card marker 129. The fact that the second card marker 131 is not marked indicates that none of the memory in the last card 125 has been modified since the last scavenge operation. In a single processor system, a single processor 135 controls mutation and garbage collection of the card-marked region of heap memory 121. Code within the mutator program marks the cards in the card mark vector 133 as the program executes. The garbage collection process examines the marked cards for changed or new pointers.

A card marking implementation is described in *A Fast Write Barrier for Generational Garbage Collectors* by Urs Hölzle, presented at the OOPSLA '93 Garbage Collection Workshop in Washington D.C. in October 1993. This paper is included by reference as illustrative of the prior art and can be found on the internet at:

"http://self.sunlabs.com/papers/write-barrier.html".

A prior art heap allocation process is illustrated in FIG. 1c. Here a 'heap allocation' process, indicated by general reference character 150, initiates at a 'start' terminal 151 and continues to a 'node allocation' procedure 153 that attempts to allocate a node from the heap. An 'insufficient heap' decision procedure 155 then determines whether or not the 'node allocation' procedure 153 successfully allocated the node. The 'heap allocation' process 150 completes through an 'end' terminal 157 if the 'node allocation' procedure 153 was successful (meaning that the node was allocated from the creation area of the heap) as determined by the 'insufficient heap' decision procedure 155. However, the 'heap allocation' process 150 continues to a 'garbage collection' procedure 159 if the 'node allocation' procedure 153 was unsuccessful. The 'garbage collection' procedure 159 performs garbage collection processes to generate free space in the heap. It does this by first stopping mutation of the heap and then scavenging (copying) all living nodes from one area of the heap to another while updating references (pointers) to point to the new copy of the node instead of the original node. Next, the 'heap allocation' process 150 again attempts to allocate the node at the 'node allocation' procedure 153 and if successful the 'heap allocation' process 150 completes through the 'end' terminal 157. One skilled in the art will understand that if the heap is filled with accessible nodes such that the 'garbage collection' procedure 159 is unable to free enough space to allocated the requested node that other procedures (not shown) are required to handle the heap-full condition.

FIG. 1d illustrates a prior art uniprocessor garbage collection process 170 used to scavenge live nodes. The uniprocessor garbage collection process 170 initiates at a 'start' terminal 171 and continues to a 'locate pointer' procedure 173 that locates a pointer from the mutator's stack, static variables, and heap. Next, the uniprocessor garbage collection process 170 continues to a 'scavenge live node' procedure 175 that scavenges the live node referenced by the pointer. The uniprocessor garbage collection process 170 repeats the 'locate pointer' procedure 173 and the 'scavenge live node' procedure 175 until all the pointers have been processed. Then, the uniprocessor garbage collection process 170 continues to a 'search copied nodes for pointer to new' procedure 177 that searches the nodes that were copied during the 'scavenge live node' procedure 175 to locate pointers in the copied nodes that reference new nodes. The uniprocessor garbage collection process 170 completes through an 'end' terminal 179 after all copied nodes have been searched. Once a copied node is found that contains a pointer to new, the uniprocessor garbage collection process 170 continues to a 'node already copied' decision procedure 181 that determines whether the node has been copied. If the node has not been copied, the uniprocessor garbage collection process 170 continues to a 'copy node' procedure 183 that copies the node. Regardless of the decision at the 'node already copied' decision procedure 181 the uniprocessor garbage collection process 170 then continues to an 'update pointer' procedure 185 that updates the pointer to new. The uniprocessor garbage collection process 170 then repeats through the 'search copied nodes for pointer to new' procedure 177 until all copied nodes have been searched.

The prior art in garbage collection is well discussed in *Garbage Collection, Algorithms for Automatic Dynamic Memory Management*, by Richard Jones and Rafael Lins, John Wiley & Sons, ISBN 0-471-94148-4, copyright 1996, hereby incorporated by reference as indicative of the prior art.

Although the generational garbage collection procedures are very efficient, the prior art has found it difficult to apply these procedures to multiprocessor systems that share a heap memory between the processing units. In a multiprocessor system, one processor may be allocating a node (thus mutating the shared heap) while another processor is performing a garbage collection on the shared heap. One prior art approach to this problem is to implement a "read-barrier" that checks each pointer reference to verify that the node accessed through the pointer is not being moved. However, this approach imposes an overhead for each read access to a node. A read-barrier can also be implemented using memory access control facilities. These memory access control facilities can be configured to detect an attempted access within a range of memory locations and to post an exception when such an access occurs. This approach removes the overhead for each read operation but at the expense of manipulating memory page tables and of occasional exception processing. In addition, some computers do not have such a memory capability.

Another difficulty with the prior art approaches is that they require the maintenance of complex invariants to coordinate each processor's access to nodes in the shared heap. Thus, concurrent mutation and garbage collection processes must coordinate with each other. This coordination is complex, error prone, and difficult to debug.

SUMMARY OF THE INVENTION

The present invention provides an economical, apparatus, method, system and computer program product for providing enhanced operation of garbage collection programs in a multiprocessor environment. One aspect of the invention is a computer controlled method for garbage collecting a shared heap memory that is subject to mutation by a plurality of processing units. This method comprises a step of detecting an initiate garbage collection condition by one of the plurality of processing units. The method also includes the steps of pausing mutation of the shared memory by the plurality of processing units and of initiating a generational garbage collection process in the plurality of processing units. The method then performs the step of detecting completion of the garbage collection process in the plurality of processing units. Once the completion of the garbage collection process is detected, the method performs the step of resuming mutation of the shared heap memory by the plurality of processing units.

Another aspect of the invention is an apparatus having a plurality of processing units coupled to a shared heap memory. The shared heap memory is accessible by the plurality of processing units. The apparatus includes a first detection mechanism that is configured to detect an initiate garbage collection condition by one of the plurality of processing units. The apparatus also includes a mutation suspension mechanism that is responsive to the first detection mechanism. The mutation suspension mechanism is configured to pause mutation of the shared heap memory by the plurality of processing units. Additionally, the apparatus includes an initiation mechanism that is configured to initiate a generational garbage collection process in the plurality of processing units after the plurality of processing units pause mutation of the shared heap memory in response to the mutation suspension mechanism. The apparatus also includes a second detection mechanism that is configured to detect completion of the generational garbage collection process in the plurality of processing units. These generational garbage collection processes initiated by the initiation mechanism. The apparatus also includes a resumption mechanism that is configured to resume mutation of the shared heap memory by the plurality of processing units. This resumption mechanism is responsive to the second detection mechanism.

Another aspect of the invention is a system having a computer that includes a plurality of processing units coupled to a shared heap memory. The shared heap memory is accessible by the plurality of processing units. The system includes a first detection mechanism that is configured to detect an initiate garbage collection condition by one of the plurality of processing units. The system also includes a mutation suspension mechanism that is responsive to the thirst detection mechanism. The mutation suspension mechanism is configured to pause mutation of the shared heap memory by the plurality of processing units. Additionally, the system includes an initiation mechanism that is configured to initiate a generational garbage collection process in the plurality of processing units after the plurality of processing units pause mutation of the shared heap memory in response to the mutation suspension mechanism. The system also includes a second detection mechanism that is configured to detect completion of the generational garbage collection process in the plurality of processing units. These generational garbage collection processes initiated by the initiation mechanism. The system also includes a resumption mechanism that is configured to resume station of the shared heap memory by the plurality of processing units. This resumption mechanism is responsive to the second detection mechanism.

Yet a further aspect of the invention is a computer program product embedded on a computer usable medium for causing a computer, having a plurality of processing units coupled to a shared heap memory, to mutate and garbage-collect the shared memory. When executed on a computer, the computer readable code causes a computer to effect a first detection mechanism, a mutation suspension mechanism, an initiation mechanism, a second detection mechanism, and a resumption mechanism. Each of these mechanisms having the same functions as the corresponding mechanisms for the previously described apparatus.

The foregoing and many other aspects of the present invention will no doubt become obvious to those of ordinary skill in the art after having read the following detailed description of the preferred embodiments that are illustrated in the various drawing figures.

DESCRIPTION OF THE PREFERRED EMBODIMENTS

Notations and Nomenclature

Figure 1A:
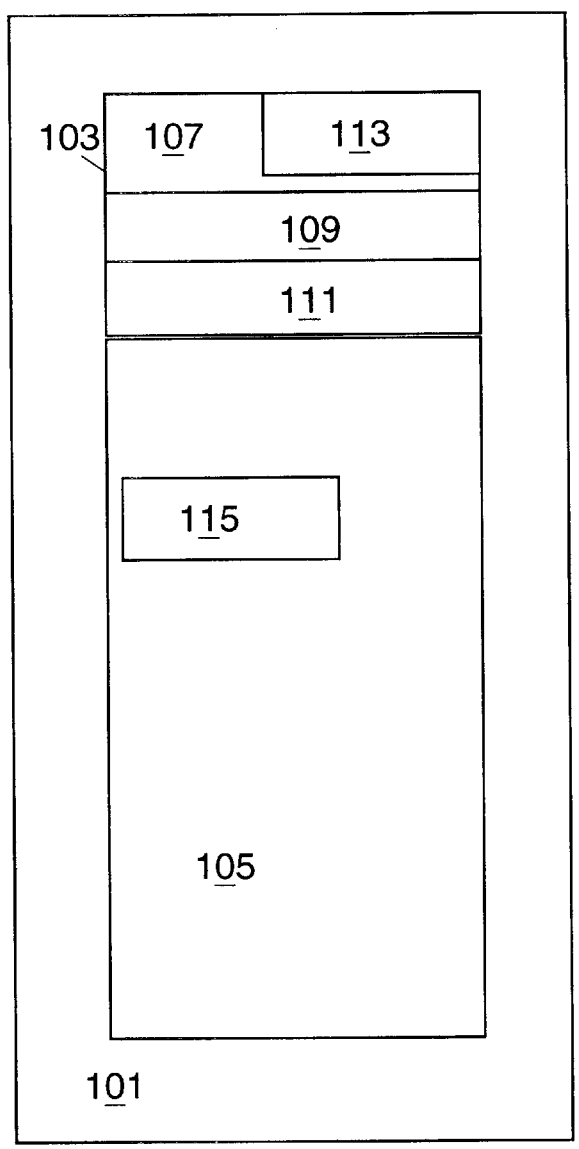
FIGS. 1a–1d illustrate various prior art aspects of heap memory garbage collection.

The following 'notations and nomenclature' are provided to assist in the understanding of the present invention and the preferred embodiments thereof.

Node—An area of memory allocated from the heap.

Object—An instantiated object resides in a node. It generally contains instance variables and a pointer to a class that references the object's methods.

Pointer—A value used as an address to a node. By locating pointers to nodes a garbage collection algorithm determines which nodes are live.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Overview

The manipulations performed by a computer in executing computer instructions are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

One skilled in the art will understand that, although the figures and illustrations use a particular bit ordering within the computer memory word, the actual bit ordering is irrelevant to the invention. Further, one skilled in the art will understand that illustrations of data structures in memory start at the lower addressed memory at the top of the structure and extend to higher addressed memory.

Operating Environment

Figure 2:
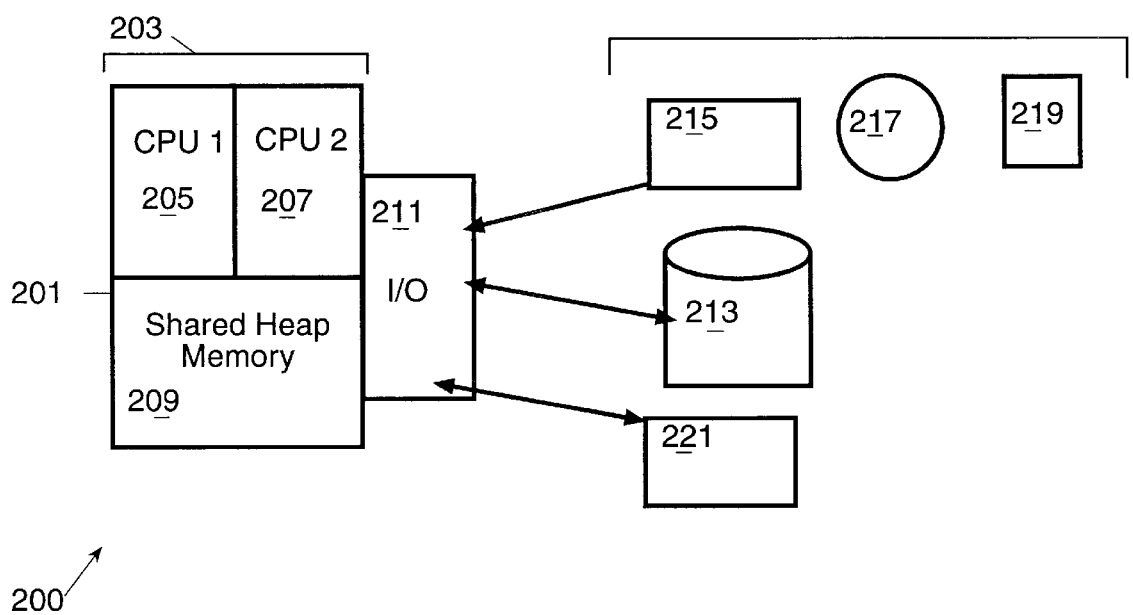
FIG. 2 illustrates a multiprocessor computer system capable of using the invention in accordance with a preferred embodiment.

Some of the elements of a multiprocessor computer, as indicated by general reference character 200, configured to support the invention are shown in FIG. 2 wherein a central processor unit (CPU) 201 is shown, having at least two processing units 203 (such as a first CPU 205 and a second CPU 207), a shared heap memory 209 and an input/output (I/O) section 211. The input/output (I/O) section 211 is connected to a disk storage unit 213 and a CD-ROM drive unit 215. The CD-ROM drive unit 215 can read a CD-ROM medium 217 that typically contains a program and data 219. A user control device 221 provides a user with controlling access to the multiprocessor computer 200 either directly, through a network, or through some other equivalent means. The CD-ROM drive unit 215, along with the CD-ROM medium 217, and the disk storage unit 213 comprise a filestorage mechanism. Such a computer system is capable of executing applications that embody the invention.

Figure 3:
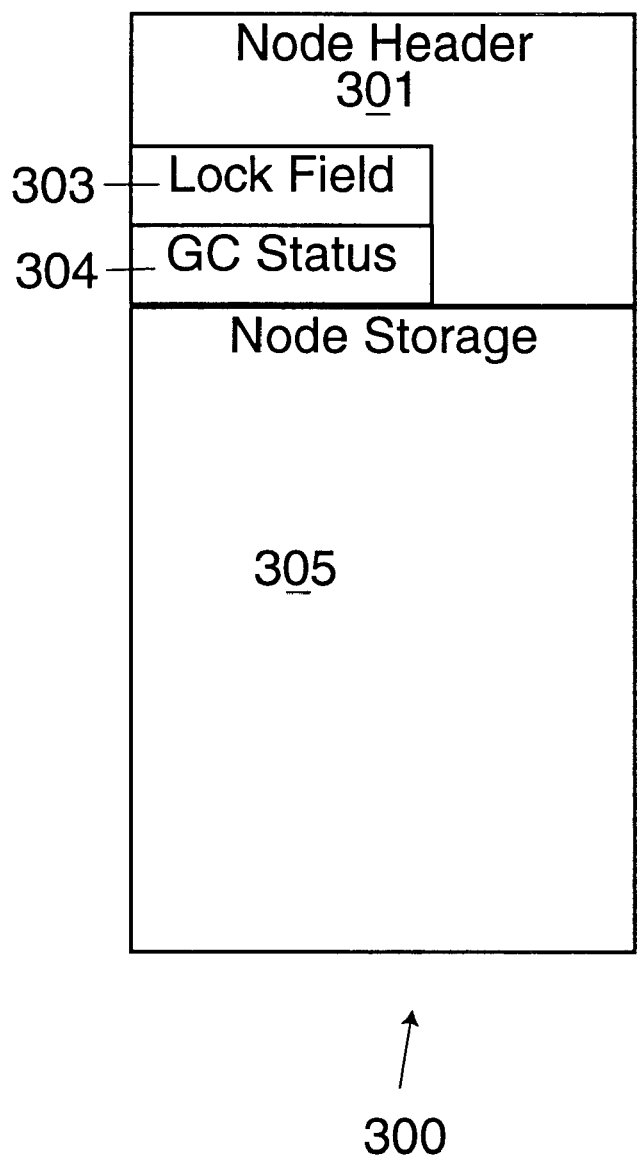
FIG. 3 illustrates the structure of a node in the shared heap in accordance with a preferred embodiment.

FIG. 3 illustrates a node in heap memory as indicated by general reference character 300 including a node header 301 containing a 'node lock' field 303 and a 'garbage collection status' field 304. One skilled in the art will understand that the node header 301 includes node specific information and possibly other heap management information. The 'node lock' field 303 contains information that allows one skilled in the art to lock the node as to the other processing units. The 'garbage collection status' field 304 contains information specific to the generational garbage collection process. This information includes whether the node has been promoted. The node 300 also includes a 'node storage' area 305 that is used by the mutator to store mutator-specific information.

Figure 4A:
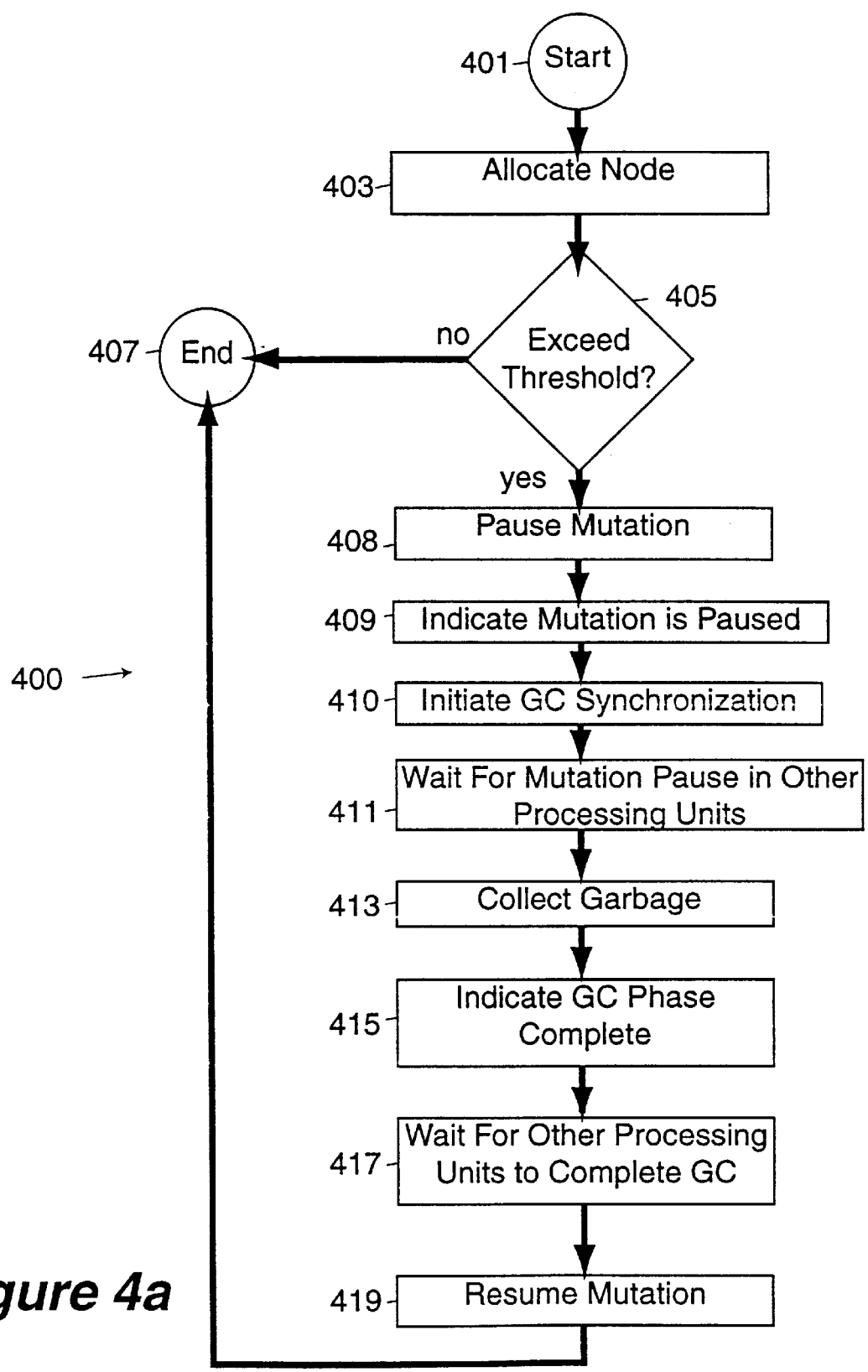
FIGS. 4a–4b illustrate shared heap allocation processes in accordance with a preferred embodiment.

FIG. 4a illustrates a 'node allocation' process, indicated by general reference character 400, that initiates at a 'start' terminal 401 and continues to a 'node allocation' procedure 403. The 'node allocation' procedure 403 executes in one of the processing units and allocates a node from the shared heap memory 209. Once the node is obtained, the 'node allocation' process 400 continues to a 'threshold exceeded' decision procedure 405 that determines whether the 'node allocation' procedure 403 reduced the amount of shared memory available for future allocation below a threshold.

That is, whether the 'node allocation' procedure 403 generated a limited heap memory condition. If this threshold was not reached, the 'node allocation' process 400 completes through an 'end' terminal 407. However if the threshold was reached, the 'node allocation' process 400 continues to a 'pause mutation' procedure 408 that pauses execution of code in the processing unit that can mutate the shared heap memory 209. One skilled in the art will understand that other conditions exist for initiating garbage collection other than exceeding a memory threshold. These methods include, without limitation, expiration of a timer or a counter. An 'indicate mutation is paused' procedure 409 indicates to the other processing units that this processing unit has paused its mutation of the shared heap memory 209. Next, an 'initiate garbage collection synchronization' procedure 410 signals a synchronization process with the processing units. Then, the 'node allocation' process 400 continues to a 'wait for mutation pause' procedure 411 that monitors the other processing units that can mutate the shared heap memory 209. The 'wait for mutation pause' procedure 411 waits until these processing units signal that they have paused their mutating processes. Once all the processing units have paused the mutating processes, the 'node allocation' process 400 advances to a 'collect garbage' procedure 413 that performs the generational garbage collection process in the shared heap memory 209 as is subsequently described. After the processing unit completes its garbage collection operation, the 'node allocation' process 400 advances to an 'indicate garbage collection phase complete' procedure 415 that signals the other processing units that this processing unit has completed its garbage collection processing. Next the 'node allocation' process 400 continues at a 'wait for other processing units to complete garbage collection' procedure 417 that monitors the state of the other processing units to detect when all processing units have completed garbage collection. Mutation is resumed at a 'resume mutation' procedure 419 after all processing units that can garbage collect the shared heap memory 209 indicate that their garbage collection process is complete. Next, the 'node allocation' process 400 completes through the 'end' terminal 407.

Figure 4B:
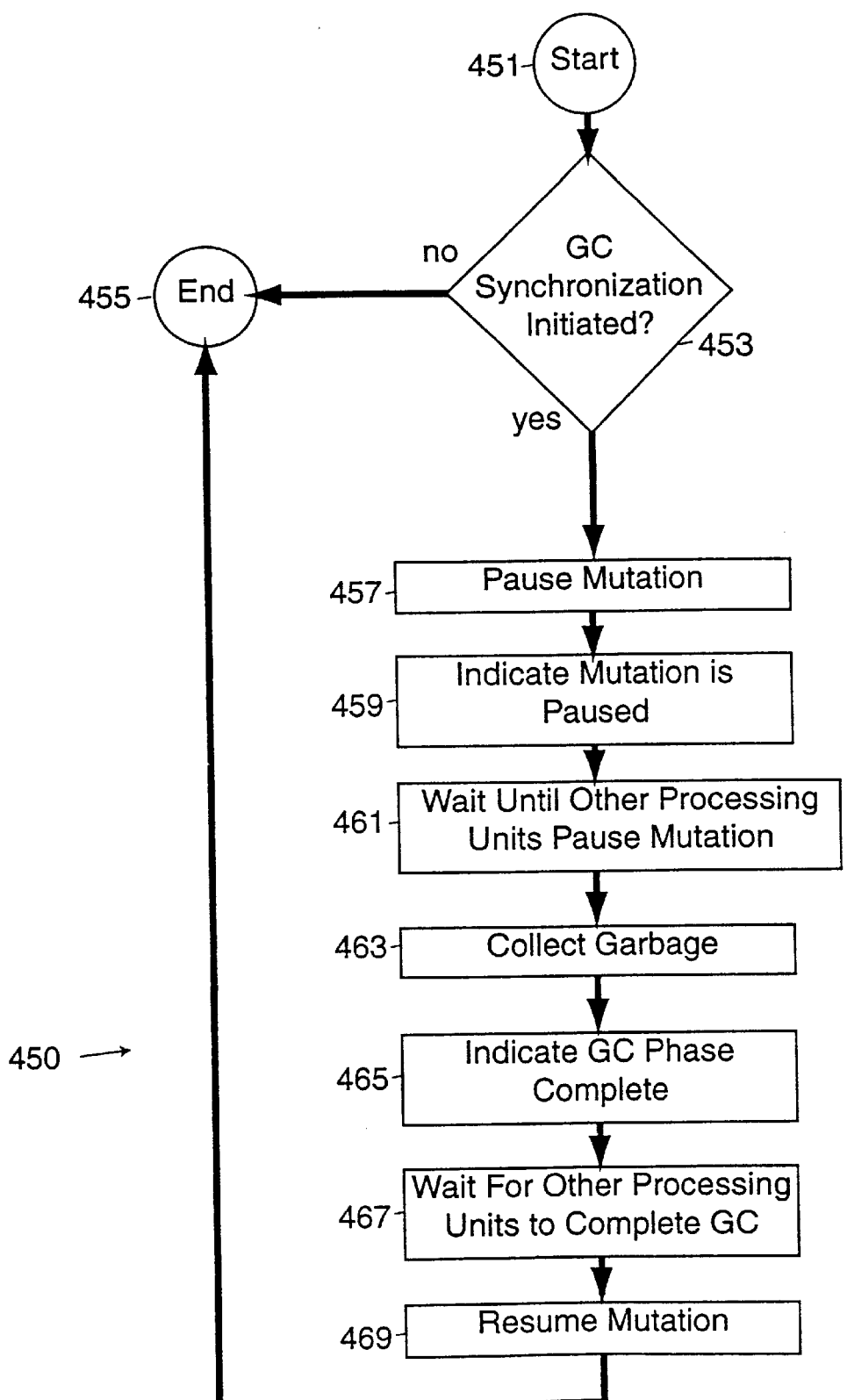

FIG. 4b illustrates a 'detect garbage collection phase' process indicated by general reference character 450 that initiates at a 'start' terminal 451 and continues to a 'garbage collection synchronization initiated' decision procedure 453. The 'detect garbage collection phase' process 450 is invoked in each processing unit when the processing unit executes a call instruction, a backwards branch instruction, or is ready to return from a runtime support routine. One skilled in the art will understand that these circumstances are illustrative and that the invention may be invoked by other conditions. The 'garbage collection synchronization initiated' decision procedure 453 determines whether the signal to stop mutation (such as set by the 'initiate garbage collection synchronization' procedure 410) has been raised. If the signal has not been raised, the 'detect garbage collection phase' process 450 completes through an 'end' terminal 455. However, if the signal has been raised, the 'detect garbage collection phase' process 450 continues to a 'pause mutation' procedure 457 that inhibits all processes executing in the processing unit from mutating the shared heap memory 209. Generally this is accomplished by suspending those threads or processes that access the shared heap memory 209. After these processes are inhibited from mutating the shared heap memory 209, the 'detect garbage collection phase' process 450 continues to an 'indicate mutation paused' procedure 459. The 'indicate mutation paused' procedure 459 signals that this processing unit has paused mutation. Next a 'wait until other processing units pause mutation' procedure 461 monitors the signals of the other processing units to determine when the other processing units have paused mutation. Once these processing units have paused mutation, one or more of the processing units can continue to a 'collect garbage' procedure 463. The 'collect garbage' procedure 463 is a modified generational garbage collection process as is subsequently described. After the 'collect garbage' procedure 463 finishes the 'detect garbage collection phase' process 450 continues to an 'indicate garbage collection phase complete' procedure 465 that raises a signal that this processing unit has completed the 'collect garbage' procedure 463. The processing unit then waits at a 'wait for other processing units to complete garbage collection' procedure 467 until it detects that the other processing units have also signaled that they have completed garbage collection. Once the other processing units signal completion of their garbage collection process, a 'resume mutation' procedure 469 in each processing unit resumes mutation of the shared heap memory 209 by the processes inhibited by the 'pause mutation' procedure 457. Finally, the 'detect garbage collection phase' process 450 completes through the 'end' terminal 455.

Figure 5:
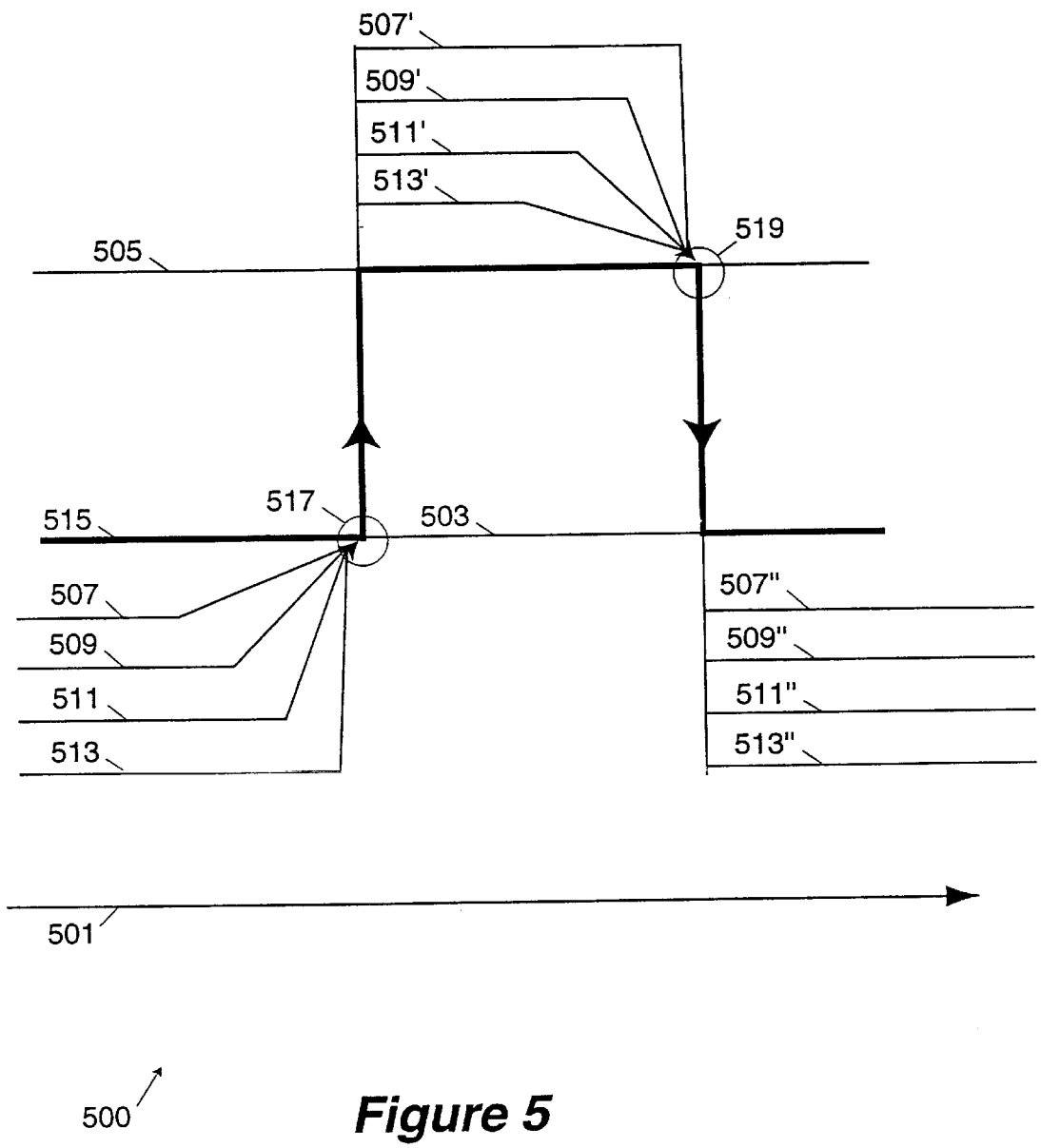
FIG. 5 illustrates an event timeline in accordance with a preferred embodiment.

FIG. 5 illustrates an event timeline indicated by general reference character 500 that shows the sequence of the processes previously described for FIG. 4a and FIG. 4b. An arrow-of-time 501 indicates the direction of increasing time. Lines below a mutation event line 503 indicate that processing units are able to perform mutation. Lines above a garbage collection event line 505 indicate that processing units are able to perform generational garbage collection. The event timeline 500 shows the events related to the invention assuming the use of four parallel processing units each represented by an event line: a first processing unit event line 507 represents the mutation and generational garbage collection operations of a first processing unit; a second processing unit event line 509 represents the mutation and generational garbage collection operations of a second processing unit; a third processing unit event line 511 and a fourth processing unit event line 513 represent respective mutation and generational garbage collection operations. These lines 507, 509, 511, 513 are primed and double primed to indicate different processing states in the same processing unit. When a processing unit is capable of mutating the shared heap memory 209, its respective line is horizontal and below the mutation event line 503. When a processing unit is capable of garbage collecting the shared heap memory 209 the line is horizontal and above the garbage collection event line 505. When the line is not horizontal, the respective processing unit is unable to garbage collect or mutate the shared heap memory 209 and is waiting to synchronize with the other processing units. A multiprocessor event line 515 indicates when the multiprocessor is capable or mutating the shared heap memory 209 or when the multiprocessor is garbage collecting the shared heap memory 209. Thus, at a start time the processing units representing these lines 507, 509, 511, 513 are all capable of mutating the shared heap memory 209. Thus, the multiprocessor event line 515 is on the mutation event line 503. At some point, a mutator in the processing unit represented by the first processing unit event line 507 attempts to allocate a node from the heap and determines that the free space in creation area of the heap is below a threshold value in accordance with the process previously described for FIG. 4a. Then, the first processing unit suspends mutation, raises a garbage collect indicator and waits for the other processing units to also pause mutation. At this point the line representing the first processing unit starts to slant towards a 'mutation suspension synchronization' event 517. As the other processing units detect the garbage collect indicator asserted by the first processing unit, they also suspend mutation and raise their own garbage collect indicator. Eventually the last processing unit (represented by the fourth processing unit event line 513) suspends mutation and the convergence of these lines 507, 509, 511, 513 at the 'mutation suspension synchronization' event 517 indicate that the processing units are synchronized and that the shared heap memory 209 is no longer subject to mutation. At this point, the multiprocessor generational garbage collection process is greatly simplified because the shared heap memory 209 is no longer subject to mutation. Once these lines 507, 509, 511, 513 converge at the 'mutation suspension synchronization' event 517 the multiprocessor event line 515 transitions from the mutation event line 503 to the garbage collection event line 505. Now, each processing unit 507', 509', 511', 513' starts to garbage collect the shared heap memory 209 as is subsequently described. As each processing unit 507', 509', 511', 513' completes its generational garbage collection process it waits for the other processing units to complete. This condition is satisfied at a 'garbage collection complete synchronization' event 519. Once the processing units are synchronized, indicating that all the garbage nodes are recovered, the multiprocessor event line 515 transitions from the garbage collection event line 505 to the mutation event line 503 and each processing unit resumes mutation operations as indicated by the double primed event lines 507", 509", 511", 513".

Once the processing units initiate generational garbage collecting, they must not interfere with each other when processing nodes in the shared heap memory 209. As previously described, the garbage collection process generates a root set of pointers from the processor's stack, static variables, and the heap. In a multiprocessor environment, each processing unit locates pointers in its local static and stack variables. However, the process of scanning the shared heap memory 209 for pointers can be shared between the processing units.

Figure 1B:
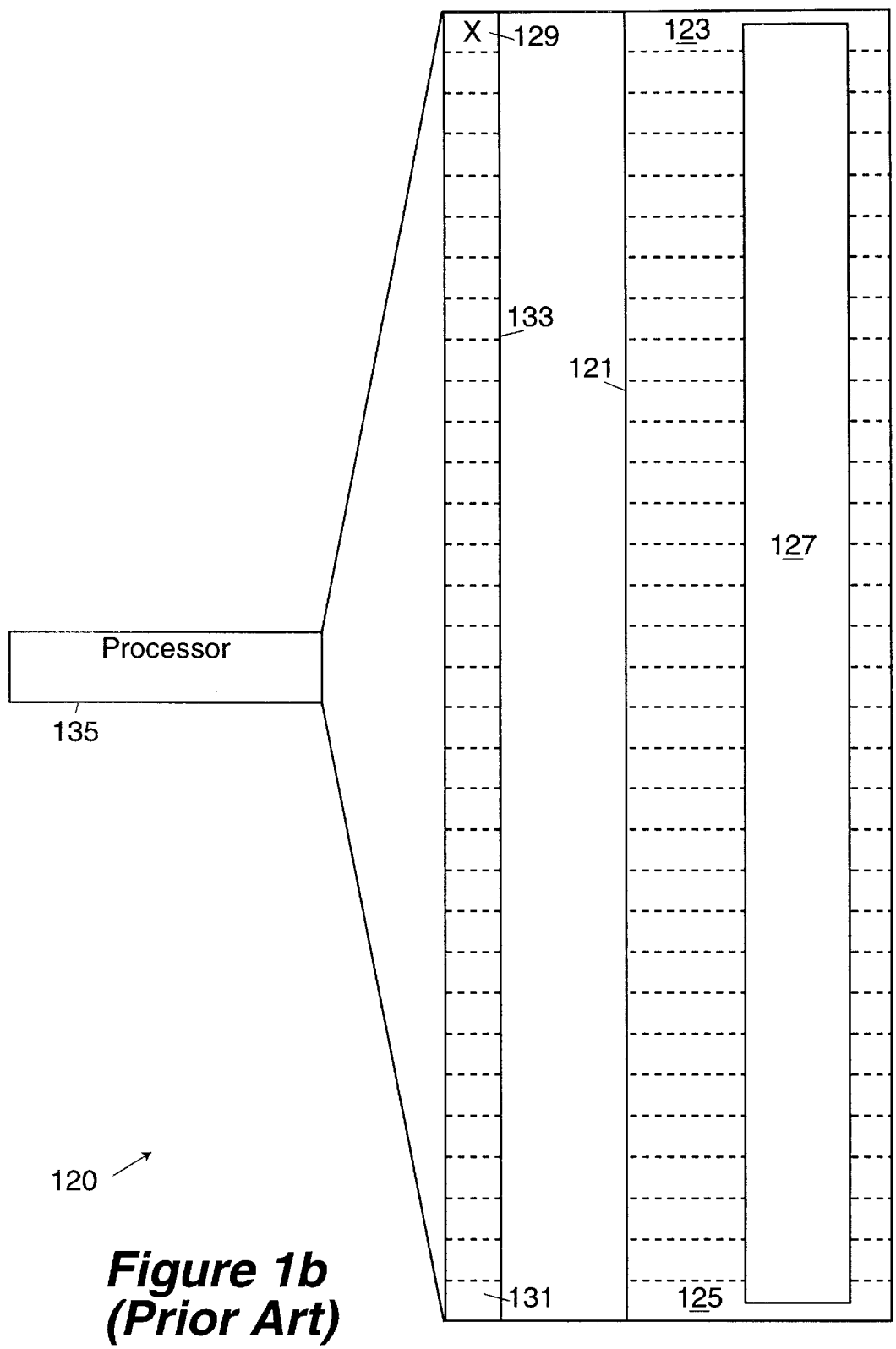
Figure 1C:
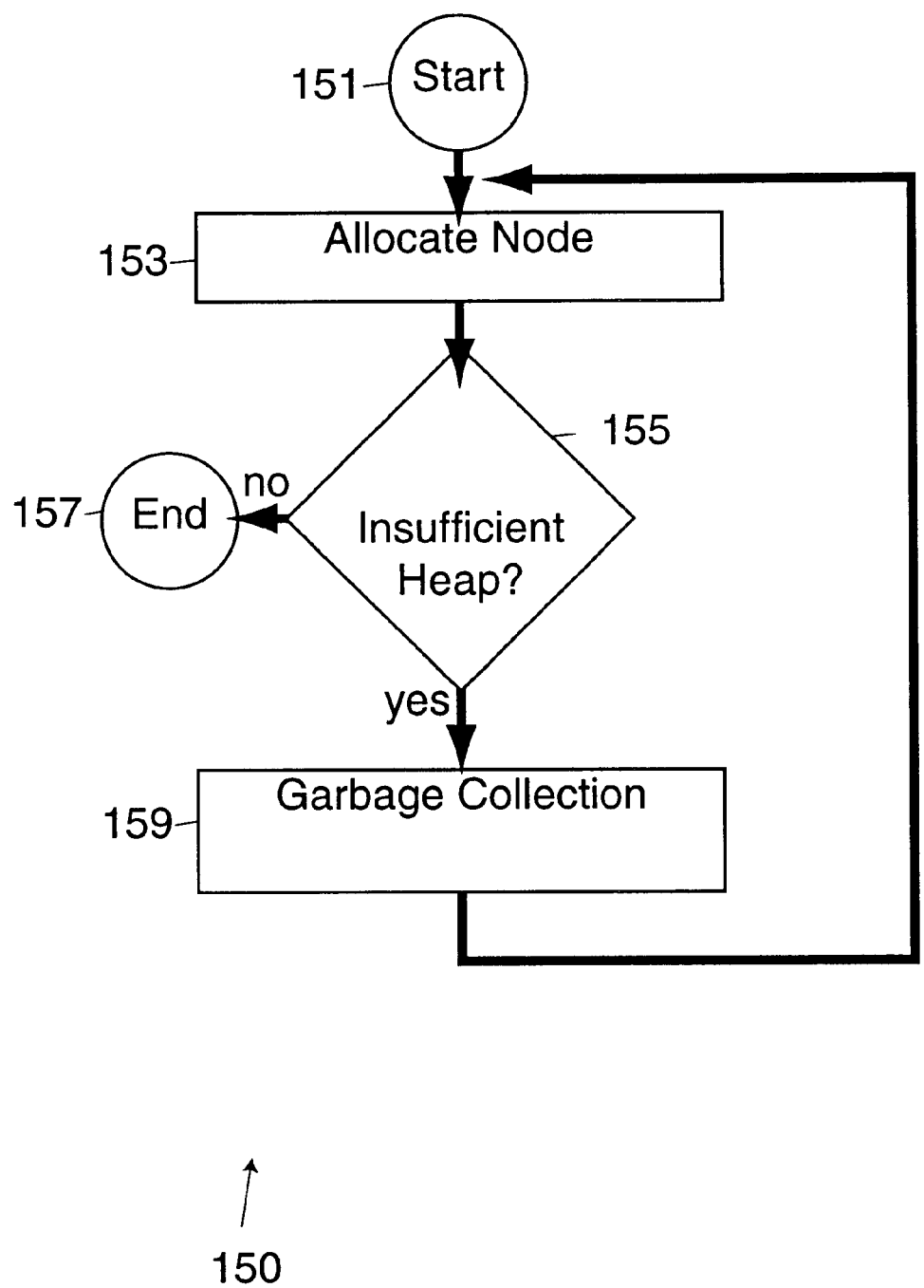
Figure 1D:
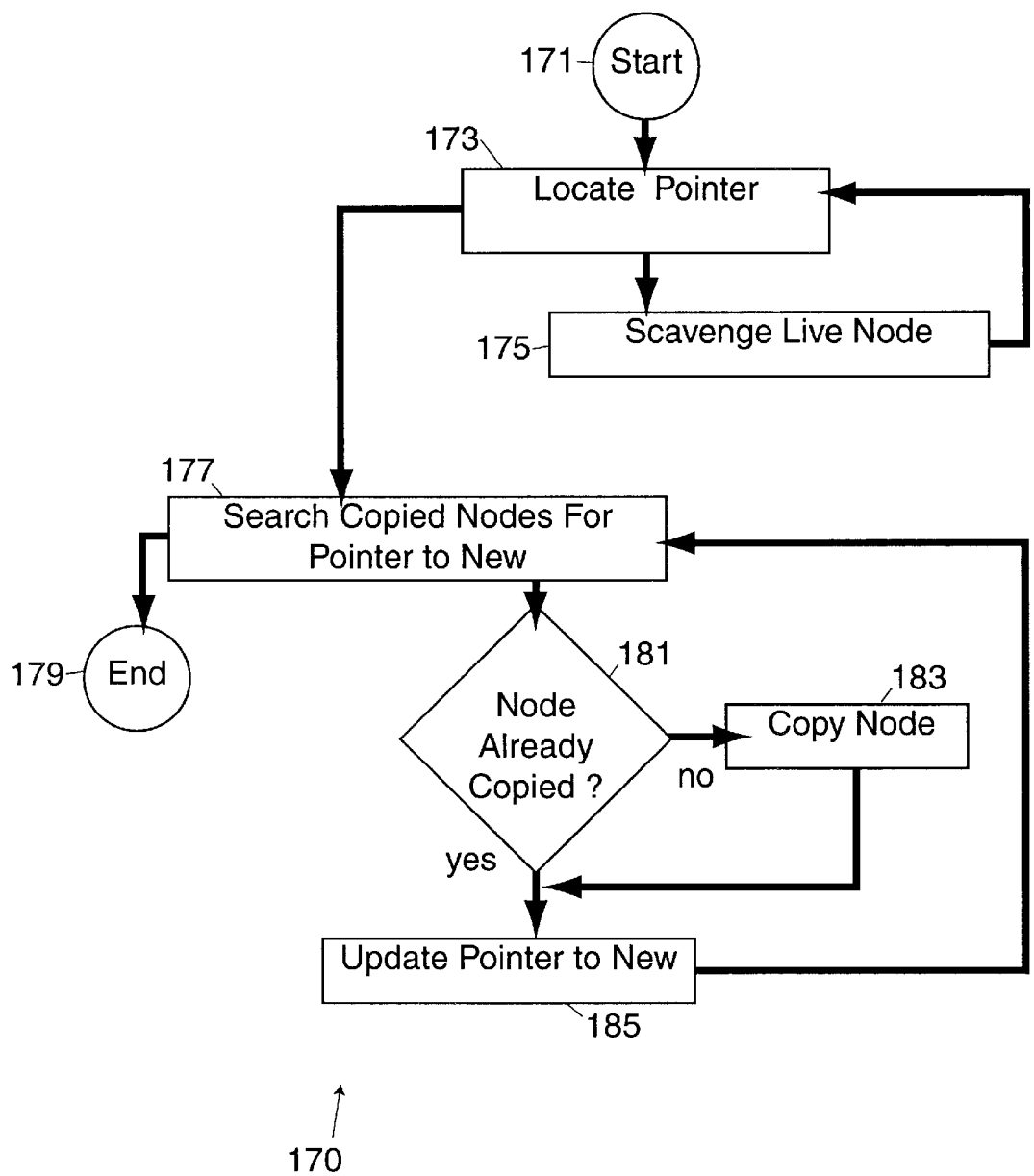
Figure 6A:
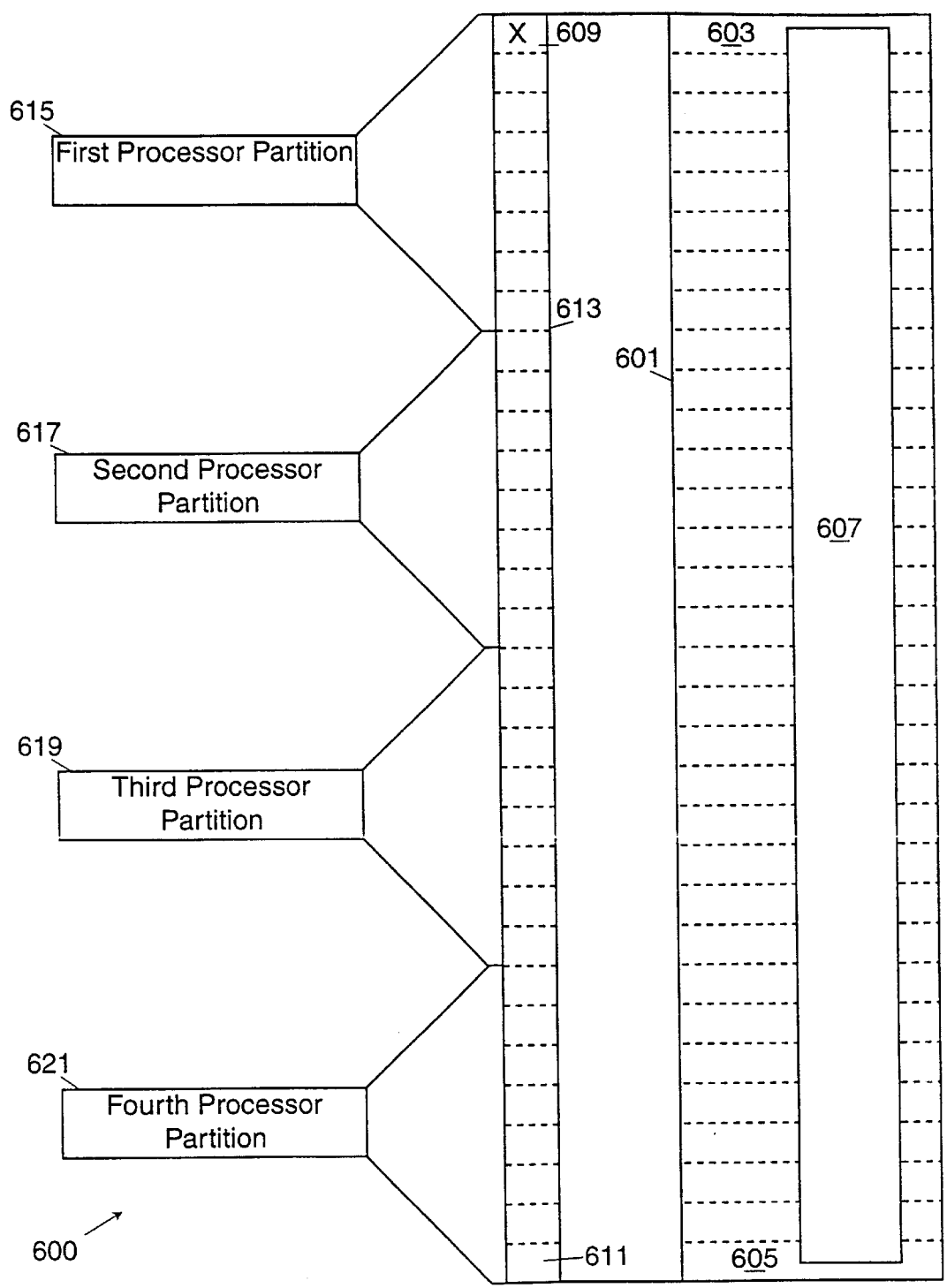
FIGS. 6a–6c illustrate a card-marked heap partitioned for processing by multiple processing units and processes using this partitioned heap in accordance with a preferred embodiment.

FIG. 6a illustrates a card-marked shared heap memory indicated by general reference character 600. The card-marked shared heap memory 600 is similar to the card-marked heap 120 shown in FIG. 1b and includes a card-marked region of shared heap memory 601, a first card 603, a last card 605, a plurality of nodes 607, a first card marker 609, and a second card marker 611. The first card marker 609 and the second card marker 611 are included in a card mark vector 613. For a multiprocessor computer having four processing units that perform garbage collection, the card-marked shared heap memory 600 is separated into four partitions: a first processor partition 615, a second processor partition 617, a third processor partition 619 and a fourth processor partition 621. The corresponding processing unit for each partition 615, 617, 619, 621 scans its partition in the card mark vector 613 to locate and process modified pointers in the corresponding portion of the card-marked region of shared heap memory 601. FIG. 6a indicates that the first card marker 609 is marked. Thus, when the first processing unit scans the first processor partition 615 of the card mark vector 613 the first processing unit will scan the first card 603 to locate pointers. Each of the other processing units also scan their portion of the card mark vector 613. Because no other cards are marked, these processing units will not need to scan their respective portions of the card-marked region of shared heap memory 601.

Figure 6B:
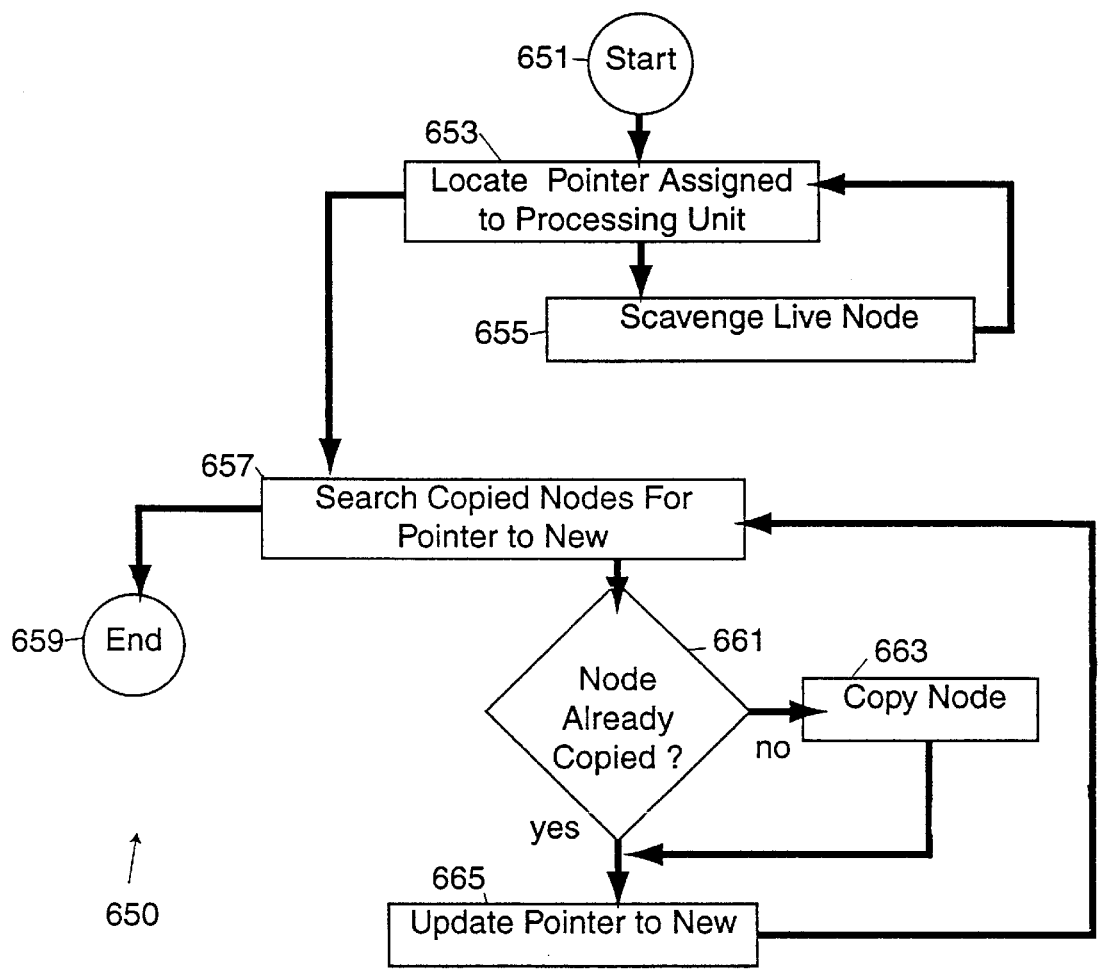

FIG. 6b illustrates a multiprocessor generational garbage collection process indicated by general reference character 650. Each processing unit performs the multiprocessor generational garbage collection process 650 when invoked from either the 'collect garbage' procedure 413 or the 'collect garbage' procedure 463. The multiprocessor generational garbage collection process 650 initiates at a 'start' terminal 651 and continues to a 'locate pointer assigned to processing unit' procedure 653. The 'locate pointer assigned to processing unit' procedure 653 examines the mutator's stack, variables and heap, as determined from the portion of the card mark vector 613 assigned to the processing unit executing the multiprocessor generational garbage collection process 650, for pointers. Next, the multiprocessor generational garbage collection process 650 continues to a 'scavenge live node' procedure 655 that scavenges the live nodes found from the 'locate pointer assigned to processing unit' procedure 653. The multiprocessor generational garbage collection process 650 repeats the 'locate pointer assigned to processing unit' procedure 653 and the 'scavenge live node' procedure 655 until these pointers have been processed. Then the multiprocessor generational garbage collection process 650 continues to a 'search copied nodes for pointer to new' procedure 657 to locate pointers in the copied nodes that reference new nodes. The multiprocessor generational garbage collection process 650 completes through an 'end' terminal 659 after all copied nodes have been searched. Once a copied node is found that contains a pointer to new, the multiprocessor generational garbage collection process 650 continues to a 'node already copied' decision procedure 661 that determines whether the node has been copied. If the node has not been copied, the multiprocessor generational garbage collection process 650 continues to a 'copy node' procedure 663 that copies the node. Regardless of the decision at the 'node already copied' decision procedure 661 the multiprocessor generational garbage collection process 650 then continues to an 'update pointer' procedure 665 that updates the pointer to new. The multiprocessor generational garbage collection process 650 then repeats through the 'search copied nodes for pointer to new' procedure 657 until all copied nodes have been searched.

Figure 6C:
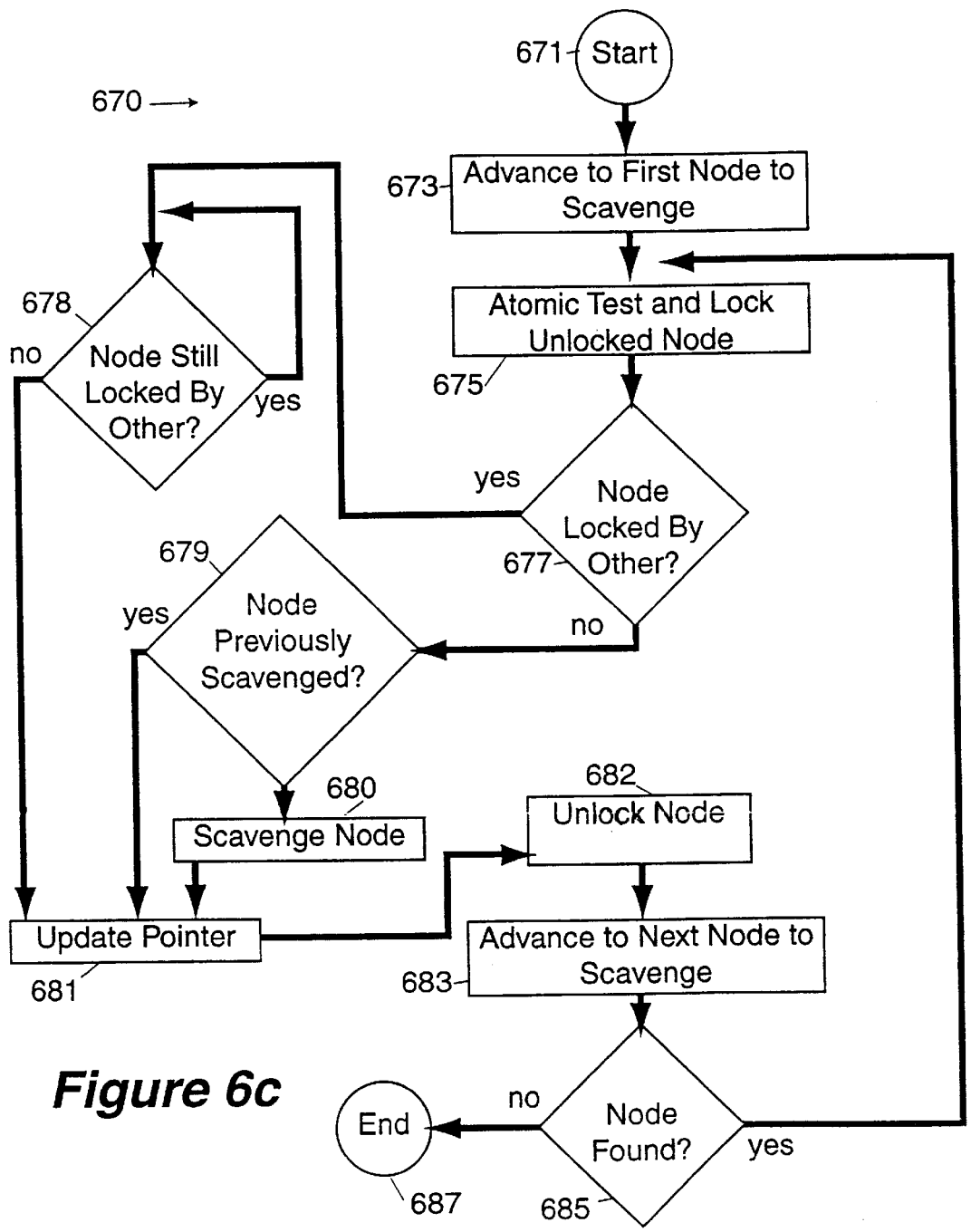

FIG. 6c illustrates a multiprocessor garbage collection process indicated by general reference character 670. The multiprocessor garbage collection process 670 is invoked by the 'search copied nodes for pointer to new' procedure 657 and initiates at a 'start' terminal 671. The multiprocessor garbage collection process 670 then continues to an 'advance to first node' procedure 673 that locates the first node in the shared heap memory 209 that the processing unit will garbage collect. Next, an 'atomic test and lock' procedure 675 attempts to lock the node using techniques well understood by one skilled in the art. Each node in the new generation must be locked before scavenging the node. Those skilled in the art will understand that nodes in the older generation may need to be locked dependent on the card marking and garbage collection techniques used. A 'node locked by other' decision procedure 677 continues to a 'node still locked' decision procedure 678 if the node is locked by another processing unit. The 'node still locked' decision procedure 678 repeats until the node becomes unlocked. If the node is not locked by another processing unit, the 'atomic test and lock' procedure 675 succeeds and locks the node for use by this processing unit so that the 'node locked by other' decision procedure 677 is not satisfied. In this circumstance, the multiprocessor garbage collection process 670 then advances to a 'node previously scavenged' decision procedure 679 that checks the 'garbage collection status' field 304 of the node to determine whether the node has already been scavenged by another processing unit. The multiprocessor garbage collection process 670 continues to a 'scavenge node' procedure 680 if the node has not been previously scavenged. The 'scavenge node' procedure 680 then performs the scavenge operation on the node as is understood by those skilled in the art. However, if the 'node previously scavenged' decision procedure 679 determines that the node has been scavenged, the multiprocessor garbage collection process 670 continues to an 'update pointer' procedure 681 that updates the pointer. Additionally, when the node is no longer locked by another at the 'node still locked' decision procedure 678 or after the node is scavenged by the 'scavenge node' procedure 680, the multiprocessor garbage collection process 670 continues to the 'update pointer' procedure 681. After the pointer is updated by the 'update pointer' procedure 681, the multiprocessor garbage collection process 670 continues to an 'unlock node' procedure 682 that unlocks the node, if it is locked, so that other processing units can operate on it if required. Next, the multiprocessor garbage collection process 670 continues to an 'advance to next node' procedure 683 that locates the next node in the shared heap memory 209 that this processing unit needs to scavenge. A 'node found' decision procedure 685 then determines whether the 'advance to next node' procedure 683 located another node for this processing unit to scavenge. If the 'advance to next node' procedure 683 located another node, the multiprocessor garbage collection process 670 loops back to the 'atomic test and lock' procedure 675 for continued processing. Otherwise, the multiprocessor garbage collection process 670 completes through an 'end' terminal 687.

One skilled in the art will understand that the previously described invention teaches a method, system, apparatus, and programming product that provides generational garbage collection facilities for a multiprocessor computer system sharing a heap memory.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for garbage collecting a shared heap memory subject to mutation by at least two processing units, said shared heap memory being divided into a plurality of partitions including a first partition and a second partition, said method comprising steps of:

(a) detecting an initiate garbage collection condition by one of said at least two processing units;

(b) pausing mutation of said shared heap memory by said at least two processing units;

(c) initiating a generational garbage collection process in said at least two processing units including a first processing unit and a second processing unit on said shared heap memory, wherein said first processing unit performs generational garbage collection on said first partition of said shared heap memory while said second processing unit performs generational garbage collection on said second partition;

wherein said generational garbage collection process includes, locating an object to be garbage collected by, searching for a marked card within said one of said plurality of partitions, and processing a pointer within said marked card to find said object to be garbage collected;

(d) detecting completion of said generational garbage collection process in said at least two processing units; and (e) resuming mutation of said shared heap memory by said at least two processing units.

2. The computer controlled method of claim 1 wherein step (b) comprises steps of:

(b1) signaling said at least two processing units to pause mutation of said shared heap memory; and (b2) waiting for said at least two processing units to pause mutation of said shared heap memory.

3. The computer controlled method of claim 1 wherein step (d) comprises steps of:

(d1) signaling, by said at least two processing units, that said generational garbage collection process has completed; and (d2) waiting for said generational garbage collection process to complete in said at least two processing units.

4. The computer controlled method of claim 1 wherein said shared heap memory is a card-marked shared heap and said method further comprises steps of:

(f) partitioning said card-marked shared heap into a plurality of partitions; and (g) assigning one of said at least two processing units to one of said plurality of partitions.

5. An apparatus having at least two processing units coupled to a shared heap memory, said shared heap memory accessible by said at least two processing units, said shared heap memory being divided into a plurality of partitions including a first partition and a second partition, wherein said apparatus comprises:

a first detection mechanism configured to detect an initiate garbage collection condition by one of said at least two processing units;

a mutation suspension mechanism, responsive to the first detection mechanism, configured to pause mutation of said shared heap memory by said at least two processing units;

an initiation mechanism configured to initiate a generational garbage collection process in said at least two processing units including a first processing unit and a second processing unit after said at least two processing units pause mutation of said shared heap memory in response to the mutation suspension mechanism, wherein said first processing unit performs generational garbage collection on said first partition of said shared heap memory while said second processing unit performs generational garbage collection on said second partition;

a garbage collection mechanism configured to locate an object to be garbage collected by, searching for a marked card within said one of said plurality of partitions, and processing a pointer within said marked card to find said object to be garbage collected;

a second detection mechanism configured to detect completion of said generational garbage collection process in said at least two processing units initiated by the initiation mechanism; and a resumption mechanism, responsive to the second detection mechanism, configured to resume mutation of said shared heap memory by said at least two processing units.

6. The apparatus of claim 5 wherein the mutation suspension mechanism comprises:
   a first signaling mechanism configured to cause said at least two processing units to pause mutation of said shared heap memory; and
   a first delay mechanism configured to wait for said at least two processing units to pause mutation of said shared heap memory.

7. The apparatus of claim 6 wherein the second detection mechanism comprises:
   a second signaling mechanism configured to cause said at least two processing units to signal that said generational garbage collection process has completed; and
   a second delay mechanism configured to wait for said generational garbage collection process to complete in said at least two processing units.

8. The apparatus of claim 6 wherein said shared heap memory is a card-marked shared heap and said apparatus further comprises:
   a partitioning mechanism configured to partition said card-marked shared heap into the plurality of partitions; and
   an assignment mechanism configured to assign one of said at least two processing units to one of said plurality of partitions, including assigning the first processing unit to the first partition and assigning the second processing unit to the second partition.

9. A computer controlled system having a computer that includes at least two processing units coupled to a shared heap memory, said shared heap memory accessible by said at least two processing units, said shared heap memory being divided into a plurality of partitions including a first partition and a second partition, wherein said system comprises:
   a first detection mechanism configured to detect an initiate garbage collection condition by one of said at least two processing units;
   a mutation suspension mechanism, responsive to the first detection mechanism, configured to pause mutation of said shared heap memory by said at least two processing units;
   an initiation mechanism configured to initiate a generational garbage collection process in said at least two processing units including a first processing unit and a second processing unit after said at least two processing units pause mutation of said shared heap memory in response to the mutation suspension mechanism, wherein said first processing unit performs generational garbage collection on said first partition of said shared heap memory while said second processing unit performs generational garbage collection on said second partition;
   a garbage collection mechanism configured to locate an object to be garbage collected by,
      searching for a marked card within said one of said plurality of partitions, and
      processing a pointer within said marked card to find said object to be garbage collected;
   a second detection mechanism configured to detect completion of said generational garbage collection process in said at least two processing units initiated by the initiation mechanism; and
   a resumption mechanism, responsive to the second detection mechanism, configured to resume mutation of said shared heap memory by said at least two processing units.

10. The computer controlled system of claim 9 wherein the mutation suspension mechanism comprises:
    a first signaling mechanism configured to cause said at least two processing units to pause mutation of said shared heap memory; and
    a first delay mechanism configured to wait for said at least two processing units to pause mutation of said shared heap memory.

11. The computer controlled system of claim 9 wherein the second detection mechanism comprises:
    a second signaling mechanism configured to cause said at least two processing units to signal that said generational garbage collection process has completed; and
    a second delay mechanism configured to wait for said generational garbage collection process to complete in said at least two processing units.

12. The computer controlled system of claim 11, wherein said shared heap memory is a card-marked shared heap and said system fuirther comprises:
    a partitioning mechanism configured to partition said card-marked shared heap into the plurality of partitions; and
    an assignment mechanism configured to assign one of said at least two processing units to one of said plurality of partitions, including assigning the first processing unit to the first partition and assigning the second processing unit to the second partition.

13. A computer program product comprising:
    a computer usable storage medium having computer readable code embodied therein for causing a computer, having at least two processing units coupled to a shared heap memory, to mutate and garbage collect the shared heap memory, said shared hear memory being divided into a plurality of partitions including a first partition and a second partition, wherein said computer readable code comprises;
    computer readable program code devices configured to cause said computer to effect a first detection mechanism configured to detect an initiate garbage collection condition by one of said at least two processing units;
    computer readable program code devices configured to cause said computer to effect a mutation suspension mechanism, responsive to the first detection mechanism, configured to pause mutation of said shared heap memory by said at least two processing units;
    computer readable program code devices configured to cause said computer to effect an initiation mechanism configured to initiate a generational garbage collection process in said at least two processing units including a first processing unit and a second processing unit after said at least two processing units pause mutation of said shared heap memory in response to the mutation suspension mechanism, wherein said first processing unit performs generational garbage collection on said first partition of said shared heap memory while said second processing unit performs generational garbage collection on said second partition;
    computer readable program code devices configured to caues said computer to effect a garbage collection mechanism configured to locate an object to be garbage collected by,
       searching for a marked card within said one of said plurality of partitions, and
       processing a pointer within said marked card to find said object to be garbage collected;

computer readable program code devices configured to cause said computer to effect a second detection mechanism configured to detect completion of said generational garbage collection process in said at least two processing units initiated by the initiation mechanism; and computer readable program code devices configured to cause said computer to effect a resumption mechanism, responsive to the second detection mechanism, configured to resume mutation of said shared heap memory by said at least two processing units.

14. The computer program product of claim 16 wherein the mutation suspension mechanism comprises:

computer readable program code devices configured to cause said computer to effect a first signaling mechanism configured to cause said at least two processing units to pause mutation of said shared heap memory; and computer readable program code devices configured to cause said computer to effect a first delay mechanism configured to wait for said at least two processing units to pause mutation of said shared heap memory.

15. The computer program product of claim 16 wherein the second detection mechanism comprises:

computer readable program code devices configured to cause said computer to effect a second signaling mechanism configured to cause said at least two processing units to signal that said generational garbage collection process has completed; and computer readable program code devices configured to cause said computer to effect a second delay mechanism configured to wait for said generational garbage collection process to complete in said at least two processing units.

16. The computer program product of claim 13 wherein said shared heap memory is a card-marked shared heap and said product further comprises:

computer readable program code devices configured to cause said computer to effect a partitioning mechanism configured to partition said card-marked shared heap into the plurality of partitions; and computer readable program code devices configured to cause said computer to effect an assignment mechanism configured to assign one of said at least two processing units to one of said plurality of partitions, including assigning the first processing unit to the first partition and assigning the second processing unit to the second partition.

\* \* \* \* \*